United States Patent [19]
Rao

[11] Patent Number: 5,178,972
[45] Date of Patent: * Jan. 12, 1993

[54] POWER CELL WITH NEW CONFIGURATION

[75] Inventor: Bhaskara M. L. Rao, Flemington, N.J.

[73] Assignee: Alupower, Inc., Warren, N.J.

[ * ] Notice: The portion of the term of this patent subsequent to Mar. 20, 2007 has been disclaimed.

[21] Appl. No.: 609,787

[22] Filed: Nov. 7, 1990

[51] Int. Cl.⁵ .......................................... H01M 6/48
[52] U.S. Cl. ........................................ 429/51; 425/6; 425/72; 425/81; 425/118; 429/119
[58] Field of Search ................... 429/119, 118, 81, 72, 429/51, 6

[56] References Cited

U.S. PATENT DOCUMENTS

| | | | |
|---|---|---|---|
| 3,462,309 | 8/1969 | Wilson | 429/119 |
| 4,020,247 | 4/1977 | Birt et al. | 429/119 |
| 4,185,143 | 1/1980 | Birt et al. | 429/119 |
| 4,822,698 | 4/1989 | Jackovitz et al. | 429/119 X |
| 4,906,535 | 3/1990 | Hoge | 429/42 |
| 4,910,102 | 3/1990 | Rao et al. | 427/118 X |
| 4,910,104 | 3/1990 | Rao et al. | 429/118 X |

Primary Examiner—Karl Group
Attorney, Agent, or Firm—Louis E. Marn

[57] ABSTRACT

There is disclosed an electrochemical power cell comprised of an anode member and cathode member mounted via an intermediate non-porous dielectric layer having a volume resistivity of at least 1000 ohm.×cm. therebetween to permit electrolytic contact to be established through the bulk electrolyte.

11 Claims, 1 Drawing Sheet

POWER CELL WITH NEW CONFIGURATION

BACKGROUND OF THE INVENTION

1. Field of the Invention

This invention relates to electrochemical cells, and more particularly to a novel electrochemical power cell.

2. Description of the Prior Art

Electrochemical power cells are conventionally assembled in parallel plate configuration with the anode or negative electrode plate member separated from the cathode or positive electrode plate member by an electrolyte gap. Cell capacity in ampere-hours is enhanced by parallel connection of a plurality of anode and cathode electrode plates to common negative and common positive terminals, respectively.

In U.S. Pat. No. 4,185,143 to Birt et al., there is disclosed a water actuated battery assembly based upon metal/organo halogen couples having anode and cathode members of planar form with a porous insulating member sandwiched therebetween where the cell is provided with electrolyte access passageways extending around the periphery of the cathode plate member whereby electrolyte flow in the passageway access the whole peripheral edge region of the cathode reactant material and thence through the porous insulating member thereby establishing an electrolyte gap as in conventional electrochemical power cells. Any solids build-up about the anode or negative electrode plate member is enhanced by the presence of the porous insulating member thereby reducing power generating capacity as well as performance.

OBJECTS OF THE PRESENT INVENTION

An object of the present invention is to provide an improved electrochemical cell of simple and stable construction.

Another object of the present invention is to provide an improved electrochemical cell of simple construction and improved operational performance, and of long life storage capability.

Still another object of the present invention is to provide an improved electrochemical cell which physically separates solids build-up at the negative electrode member from the positive electrode member.

A still further object of the present invention is to provide an improved electrochemical cell obviating solids clogging problems of the electrochemical cell.

SUMMARY OF THE INVENTION

These and other objects of the present invention are achieved by an electrochemical power cell comprised of an anode member and cathode member mounted via an intermediate non-porous dielectric layer having a volume resistivity of at least 1000 ohm. x cm. therebetween to permit electrolytic contact to be established through the bulk electrolyte.

BRIEF DESCRIPTION OF THE DRAWINGS

Further objects and advantages of the present invention will become apparent from the following detailed description when taken with the accompanying drawing, wherein.

DETAILED DESCRIPTION OF THE INVENTION

Figure 1:
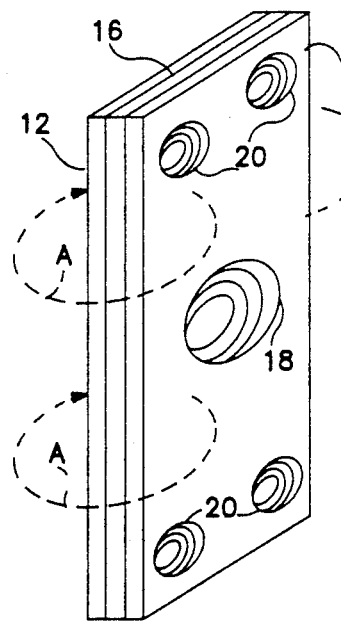
FIG. 1 is an isometric view of an electrochemical cell assembly of the present invention.

Referring now to the drawings and particularly FIG. 1, there is illustrated a cell assembly, generally indicated as 10, comprised of an anode or negative electrode plate or member 12 and cathode or positive electrode plate or member 14 held in parallelledly-disposed relationship by an intermediate layer 16 formed of a dielectric material, such as any conventional plastic material suitable for battery usage.

The anode and cathode electrode plate or member 12 and 14 may be formed of suitable aqueous stable materials exhibiting required reduction/oxidation potential relationship resulting in an adequate level of electromotive force. The anodic materials for the anode or negative plate 12 include aluminum, magnesium, zinc, aluminum alloys, magnesium alloys, zinc alloys and mixtures thereof. The cathode materials for the cathode or positive plate 14 are formed of an inert conducting substrate, such as nickel, carbon, silver, lead and the like and may be coated with a catalyst, such as paladium, platinum-palladium, iron or other low hydrogen over voltage metal for effective operation as a hydrogen electrode, i.e. water-hydrogen.

The non-porous intermediate dielectric layer 16 is formed of conventional plastic materials, such as butyl or acrylic films of a thickness of at least about 0.05 to about 100 mils. Generally, the intermediate layer 16 should exhibit a volume resistivity of at least about 1000 ohm.cm.

Figure 2:
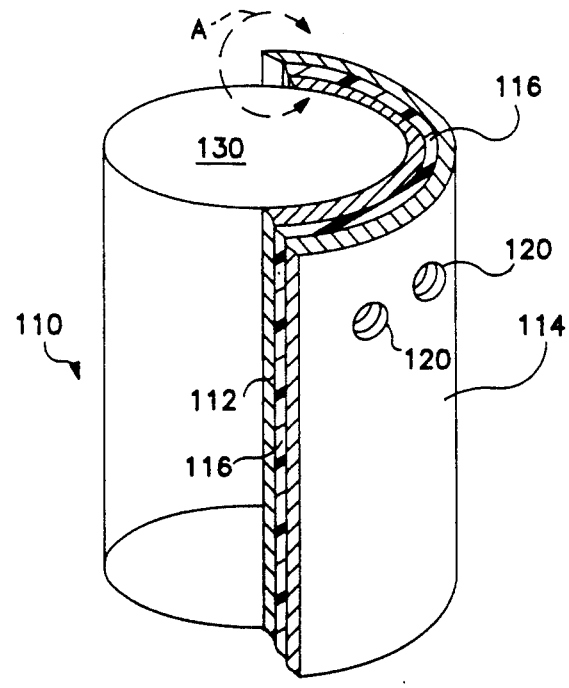
FIG. 2 is a schematic isometric view of an embodiment of an electrochemical cell assembly of the present invention.
Figure 3:
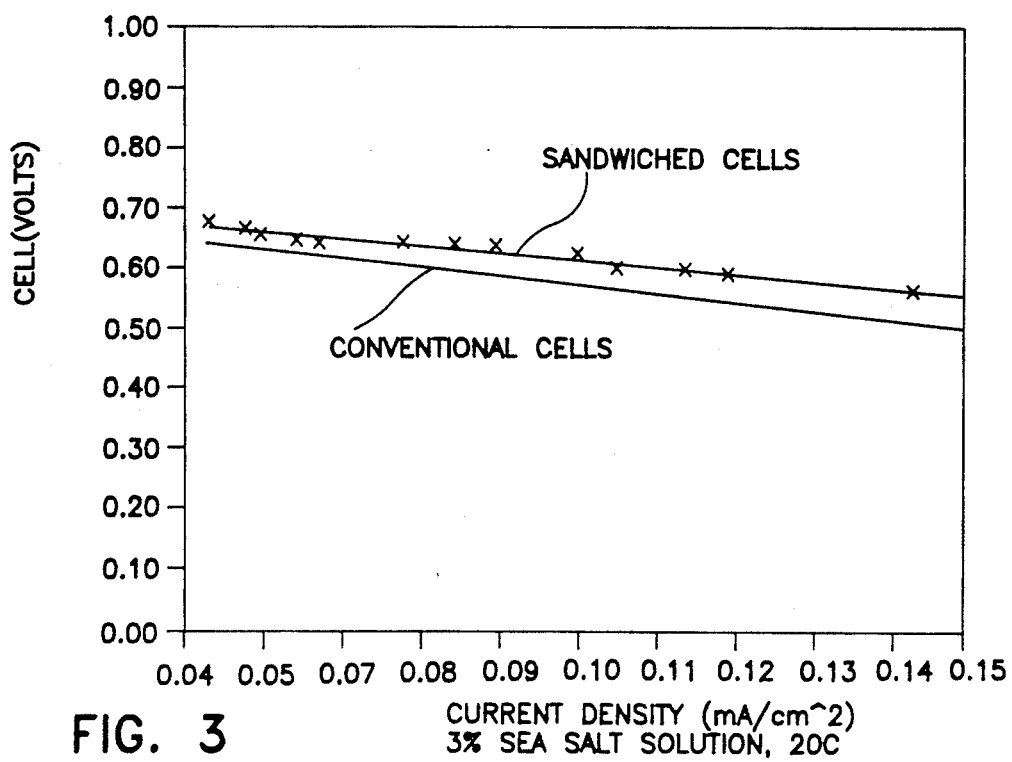
FIG. 3 is a graph showing performance of such a single electrochemical cell assembly versus a conventional anode-cathode cell with an electrolyte gap.

FIG. 2 illustrates another embodiment of the present invention wherein the electrochemical cell assembly, generally indicated as 110, is cylindrically-shaped and is comprised of an inner cylindrically-shaped anode member 112 an intermediate cylindrically-shaped dielectric layer 116 and an outer cylindrically-shaped cathode member 114. The inner cylindrically-shaped anode member 112 defines an interior cylindrically-shaped chamber 130.

Upon submersion into a suitable electrolyte, electrolytic contact is established about the bulk electrolyte (as illustrated by the dotted arrows "A") rather than by the gap between the anode and the cathode of conventional cell or the peripheral flow about the cathode through channels, as disclosed in the hereinabove discussed Birt et al. reference. To facilitate such bulk electrolyte contact, the electrochemical cell 10 of FIG. 1 may be provided with a centrally-disposed large orifice or hole 18 or a plurality of matter peripherally-disposed orifices or holes 20 extending completely through the electrochemical cell 10 to improve performance of large area electrodes by reducing electrolyte path length between the electrodes. Similarly, electrolytic contact for the electrochemical cell of FIG. 2 is established about the bulk electrolyte and may be formed with a plurality of radially-formed orifices or holes 120. Generally, there is no preferred configuration of orifice disposition with a positioning being a function to reduce electrolytic path length.

The electrochemical cells of the present invention may be readily produced in accordance with the procedures disclosed in U.S. Pat. No. 4,906,535, issued Mar. 6, 1990, and assigned to the same assignee as the present invention. The cylindrically-shaped electrochemical cell 110 of FIG. 2 is readily produced from a cylinder of anodic material successively coated with a dielectric layer 116 and cathodic material.

EXAMPLE OF THE INVENTION

Operation of the process and apparatus of the present invention is illustrated by the following example which is intended to be merely illustrative and the invention is not to be regarded as limited thereto.

EXAMPLE

A cell of the present invention is fabricated from an aluminum plate of an area of 17.5 cm$^2$ and a thickness of 0.05 cm. attached to a plastic sheet of an area of 20 cm$^2$ and a thickness of 0.3 cm. with a nickel foil of an area of 17.5 cm$^2$ and a thickness of 0.01 cm. being attached to the other side of the plastic sheet. The cell with appropriate electrical connections to the aluminum plate and nickel foil is immersed in a 3.0% percent by weight salt water solution. Measuring instruments and load resistor are connected to the electrical connections and current-voltage relationship of the cell is compared to a conventional cell of like electrode area for a 0.3 cm. electrolyte gap. The comparative results are illustrated in FIG. 2.

Advantages of the cell battery assembly of the present invention compared with conventionally gaped anode-cathode cells include:

1). Absence of cell clogging due to aluminum hydroxide formed at the anode.

2). Improved cell integrity due to the electrode support from the dielectric layer.

While the present invention has been described with reference to planar and cylindrically-shaped electrochemical cells, it is understood that other geometric-shapes may be used, e.g. elliptical, etc.

While the present invention has been described in connection with an exemplary embodiment thereof, it will be understood that many modifications will be apparent to those of ordinary skill in the art; and that this application is intended to cover any adaptations of variations thereof. Therefore, is is manifestly intended that this invention be only limited by the claims and the equivalents thereof.

What is claimed is:

1. A novel electrochemical cell, which comprises:
   a non-porous dielectric layer having a volume resistivity of at least about 1000 ohm. cm.;
   an anode member on one side of said non-porous dielectric layer and formed of an anodic material selected from the group consisting of aluminum, aluminum alloys, magnesium, magnesium alloys, zinc, zinc alloys and mixtures thereof; and
   a cathode member disposed on a side of said non-porous dielectric layer opposite said anode member and functioning as a hydrogen electrode.

2. The novel electrochemical cell as defined in claim 1 wherein said cell is provided with at least one orifice extending through said electrochemical cell.

3. The novel electrochemical cell as defined in claim 2 wherein said orifice is centrally-disposed.

4. The novel electrochemical cell as defined in claim 3 and further including a plurality of orifices extending through said electrochemical and about said centrally-disposed orifice.

5. The novel electrochemical cell as defined in claim 1 wherein said dielectric layer is of a thickness of at least about 0.05 mils.

6. The novel electrochemical cell as defined in claim 1 wherein said dielectric layer is of a thickness of from 0.05 to 100 mils.

7. The novel electrochemical cell as defined in claim 1 wherein said electrochemical cell is cylindrically-shaped.

8. The novel electrochemical cell as defined in claim 7 wherein said cylindrically-shaped electrochemical cell is comprised of an inner cylindrically-shaped anode member, an intermediate non-porous dielectric layer disposed about an outer surface of said anode member and an outer cathode member disposed about said intermediate non-porous dielectric layer.

9. The novel electrochemical cell as defined in claim 8 and further including at least one radially-formed orifice extending through said electrochemical cell.

10. The novel electrochemical cell as defined in claim 8 wherein said dielectric layer is of a thickness of at least about 0.05 mils.

11. The novel electrochemical cell as defined in claim 8 wherein said dielectric layer is of a thickness of from 0.05 to 100 mils.

* * * * *